(12) United States Patent
Cafaro et al.

(10) Patent No.: US 7,773,713 B2
(45) Date of Patent: Aug. 10, 2010

(54) CLOCK DATA RECOVERY SYSTEMS AND METHODS FOR DIRECT DIGITAL SYNTHESIZERS

(75) Inventors: Nicholas G. Cafaro, Coconut Creek, FL (US); Robert E. Stengel, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 965 days.

(21) Appl. No.: 11/584,410

(22) Filed: Oct. 19, 2006

(65) Prior Publication Data

US 2008/0095291 A1  Apr. 24, 2008

(51) Int. Cl.
*H03D 3/24* (2006.01)
(52) U.S. Cl. .............. 375/373; 375/376; 375/330; 375/371; 370/517; 370/480; 327/156; 327/158
(58) Field of Classification Search ............ 375/376, 375/330, 373; 370/517, 480, 356; 331/1; 327/156, 158, 49
See application file for complete search history.

(56) References Cited

U.S. PATENT DOCUMENTS

| | | | | |
|---|---|---|---|---|
| 4,982,350 | A | * | 1/1991 | Perna et al. ............ 702/89 |
| 5,537,442 | A | * | 7/1996 | Nakamura et al. ....... 375/330 |
| 6,125,158 | A | * | 9/2000 | Carson et al. .......... 375/376 |
| 6,959,016 | B1 | | 10/2005 | Keeth et al. |
| 7,145,398 | B2 | * | 12/2006 | Dalton et al. .......... 331/1 A |
| 2002/0110212 | A1 | | 8/2002 | Lysdal et al. |
| 2003/0128786 | A1 | | 7/2003 | Schmatz et al. |
| 2005/0152403 | A1 | * | 7/2005 | Horisaki .............. 370/480 |

OTHER PUBLICATIONS

International Search Report, PCT/US07/80664 dated Mar. 6, 2008.

* cited by examiner

*Primary Examiner*—Eva Y Puente

(57) ABSTRACT

A system and method for clock data recovery for programming direct digital synthesizers is disclosed. A counter is used to calculate a coarse measurement of the clock frequency of a received digital signal, and a tap delay line is used to calculate a fine measurement of the clock frequency of the received digital signal. The coarse and fine measurements are used to calculate a value for programming a direct digital synthesizer to produce a clock signal that is an approximate replica of the clock frequency of the received digital signal.

13 Claims, 4 Drawing Sheets

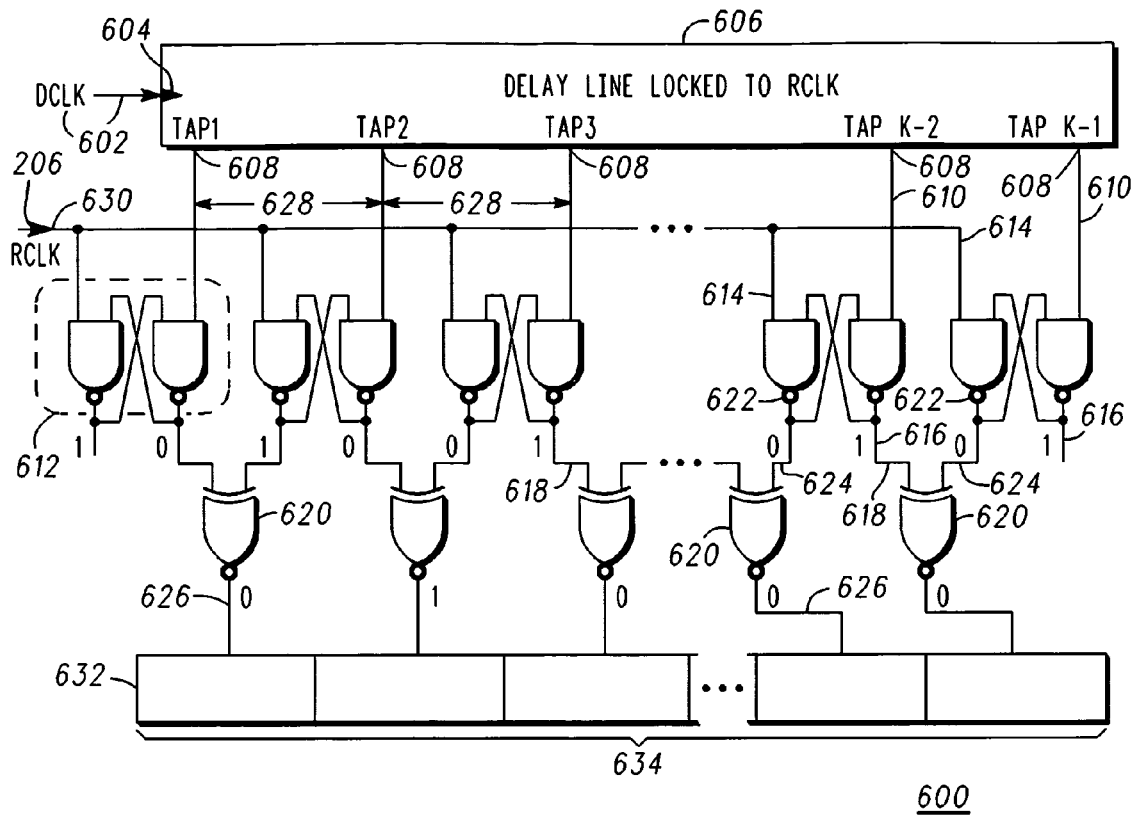
FIG. 6
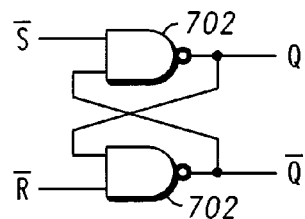
FIG. 7
| X | Y | XNOR |
|---|---|------|
| 0 | 0 | 1 |
| 0 | 1 | 0 |
| 1 | 0 | 0 |
| 1 | 1 | 1 |
FIG. 9
| $\overline{S}$ | $\overline{R}$ | Q | $\overline{Q}$ | STATE |
|---|---|---|---|---|
| 1 | 1 | 0 | 0 | MAINTAIN |
| 1 | 1 | 1 | 1 | MAINTAIN |
| 1 | 0 | 0 | 0 | RESET |
| 1 | 0 | 1 | 0 | RESET |
| 0 | 1 | 0 | 1 | SET |
| 0 | 1 | 1 | 1 | SET |
| 0 | 0 | 0 | – | INDETERMINATE |
| 0 | 0 | 1 | – | INDETERMINATE |
FIG. 8

CLOCK DATA RECOVERY SYSTEMS AND METHODS FOR DIRECT DIGITAL SYNTHESIZERS

TECHNICAL FIELD

Embodiments of the present invention relate generally to digital circuits, and more particularly to clock data recovery.

BACKGROUND

A digital signal is formed by modulating a periodic waveform having a fixed clock frequency. FIG. 1 is a diagram illustrating a digital signal 102 and its underlying clock signal 104. For this example, the digital signal 102 is encoded with a data value of logic "1" or logic "0" forming a data sequence 112, and the clock signal 104 forms a clock sequence 114 that alternates between 1 and 0. A transition from 0 to 1 or from 1 to 0 is a signal edge. A transition from 0 to 1 is a rising signal edge, and a transition from 1 to 0 is a falling signal edge. The digital signal 102 represents any arbitrary digital signal having a period 106. The frequency of the underlying clock signal 104 corresponds to the number of periods 106 that occur per second.

In order to analyze the digital signal 102 or receive its data, the frequency of the underlying clock signal 104 must be determined. This is known as clock recovery. In order to receive the data encoded in the digital signal 102, a replica of the clock signal 104 must be generated to demodulate the digital signal 102. This is known as data recovery. A combined process of clock and data recovery where the frequency of the clock signal 104 is determined and used to generate a replica of clock signal 104 is known as clock data recovery.

Clock data recovery is currently implemented in phased-locked loop (PLL) based systems by using the digital signal 102 to phase lock a variable frequency oscillator that generates the replica of clock signal 104. PLL based systems must over-sample the digital signal 102 in order to phase lock to it. For example, in today's products, the digital signal 102 data rate may be 480 Mbps and a PLL will over-sample by 4 times, which calls for a PLL clock rate of about 1920 Mbps. This higher clock rate causes added expend because of higher data rate demands for the PLL system and PLL clock. The higher clock rate may not even be possible to implement, in the PLL based systems, due to its high data rate.

Another way to generate a replica of clock signal 104 is to use a direct digital synthesizer. A direct digital synthesizer is an electronic device for digitally creating arbitrary waveforms and frequencies from a frequency oscillator. A direct digital synthesizer is given a frequency value or a data set that specifies the frequency value, and generates a clock signal at that frequency. PLL based clock data recovery systems are not designed for and are not readily compatible with a direct digital synthesizer.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 6 illustrates a schematic representation of a fine measurement system configured to calculate a fine measurement value of a clock signal frequency of a digital signal;

FIG. 7 illustrates a schematic of an inverted SR latch;

FIG. 8 is a logic table illustrating the behavior of an inverted SR latch;

FIG. 9 illustrates a standard exclusive nor (XNOR) logic table; and

DETAILED DESCRIPTION

Systems and methods for clock data recovery for direct digital synthesizers are disclosed. As will be explained in detail in the paragraphs below, a counter is used to calculate a coarse measurement of the clock frequency of a received digital signal, and a tap delay line is used to calculate a fine measurement of the clock frequency of the received digital signal. The coarse and fine measurement values are used to produce a data set to program a direct digital synthesizer to produce a clock signal that is an approximate replica of the underlying clock signal of the received digital signal.

Figure 2:
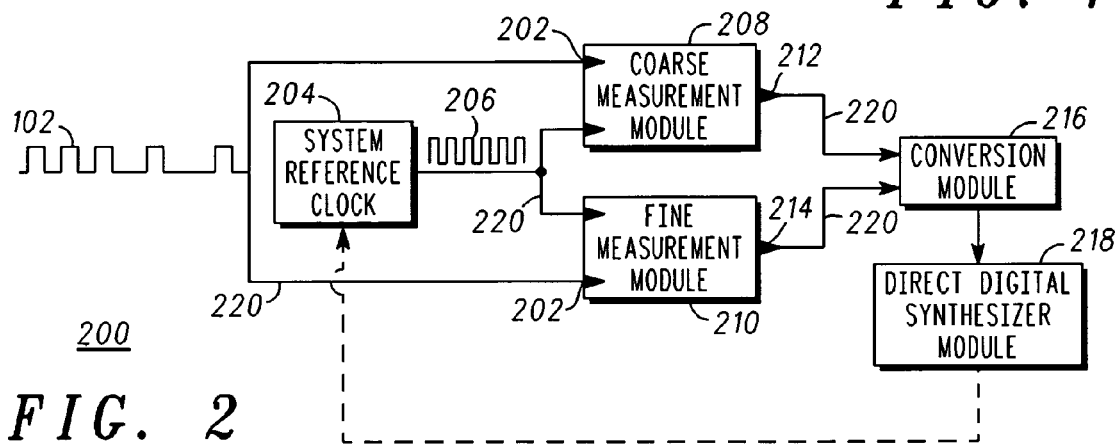
FIG. 2 illustrates a schematic representation of a clock data recovery system for a direct digital synthesizer.

FIG. 2 illustrates a schematic representation of a clock data recovery system 200, for a direct digital synthesizer, that is suitably configured to perform clock data recovery according to an example embodiment of the invention. The various blocks depicted in FIG. 2 may be realized by any number of physical components or modules located throughout the system 200. A practical system 200 for clock data recovery may include a number of electrical components, circuits and control units other than those shown in FIG. 2. Conventional subsystems, features, and aspects of system 200 will not be described in detail herein.

Figure 1:
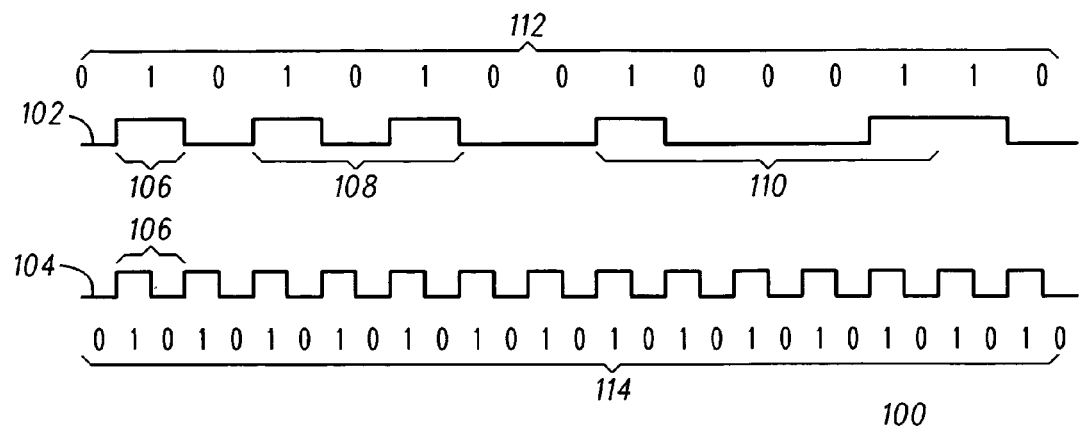
FIG. 1 is a diagram illustrating a digital signal and its underlying clock signal.

The system 200 generally includes: a digital signal input 202; a system reference clock 204 producing a reference clock signal 206; a coarse measurement module 208; a fine measurement module 210; a coarse measurement output 212; a fine measurement output 214; a conversion module 216, and a direct digital synthesizer 218. In practice, these elements may be coupled together using an interconnect bus 220 or any suitable interconnection architecture. Digital signal 102 (see FIG. 1) may be input from a signal source (not shown in FIGS. 1-2) into the digital signal input 202. The digital signal input 202 is compared to the reference clock signal 206 by both the coarse measurement module 208 and the fine measurement module 210. The result of the comparison from the coarse measurement module 208 is output at the coarse measurement output 212. The result of the comparison from the fine measurement module 210 is output at the fine measurement output 214. The coarse measurement output 212 and the fine measurement output 214 may be coupled to a conversion module 216, which may be further coupled to the direct digital synthesizer 218 in order to generate a replica of the underlying clock signal 104 of digital signal 102.

The digital signal input 202 is configured to provide access for the digital signal 102 generated at a signal source. The digital signal 102 may be, without limitation, any digital signal with an underlying clock signal 104 that needs to be analyzed such as a wireless signal, an asynchronous communication bus signal, a data port signal, and the like. The signal source may be, without limitation, any external digital signal source such as: a device under test, a universal serial bus (USB) device, a wireless phone, and the like. The digital signal input 202 is coupled to the coarse measurement module 208 and the fine measurement module 210.

The system reference clock 204 is configured to produce the reference clock signal 206. The system reference clock 204 is a standard reference clock with a fixed or variable frequency such as, without limitation, a voltage controlled oscillator (VCO). System reference clock 204 may be, without limitation, a specific part of a clock data recovery system, part of a larger system in which a clock data recovery system is a subsystem or from an external source. The system reference clock 204 is used as a basis for comparison to determine the frequency of the digital signal 102, and may have a higher or lower frequency than the frequency of the underlying clock signal 104 for digital signal 102. The system reference clock 204 is coupled to the coarse measurement module 208 and the fine measurement module 210.

The coarse measurement module 208 is configured to calculate the coarse measurement value of the digital signal clock frequency. As will be explained in more detail in relation to FIG. 4 below, the course measurement module 208 measures the number of cycles of the reference clock signal 206 in one period 106 of the digital signal 102. For example, if the period 106 of the digital signal 102 is 47.3 nanoseconds and the reference clock signal 206 has a 1 nanosecond period, the coarse measurement module 208 will compute a value of 47 (cycles). Coarse measurement module 208 may be coupled to a conversion module 216.

The fine measurement module 210 is configured to calculate the fine measurement value of the digital signal clock frequency. As will be explained in more detail in relation to FIG. 6 below, the fine measurement module measures the digital signal 102 frequency timing as a fraction of the period of the reference clock signal 206. For example, if the digital signal 102 has a 47.3 nanosecond period and the reference clock signal 206 has a 1 nanosecond period, and further if the fine measurement module 210 is configured to measure to an accuracy that is a tenth of a reference clock signal 206 period, then the fine measurement module 210 will compute a value of 3. Fine measurement module 208 may be coupled to a conversion module 216.

The conversion module 216 is configured to calculate a data set, from the coarse measurement value and the fine measurement value, for programming direct digital synthesizer 218. The conversion module 216 receives a coarse measurement value of the frequency of the underlying clock signal 104 of the digital signal 102 from the coarse measurement module 208, and a fine measurement value of the frequency of the underlying clock signal 104 of the digital signal 102 from the fine measurement module 210. The conversion module 216 is further configured to adjust the format of both the coarse measurement value and the fine measurement value to conform to requirements of the direct digital synthesizer 218. For example, the fine measurement value may be shifted and added to the coarse measurement value. In this regard, if the coarse measurement module 208 returns a value of 47, and fine measurement module 210 returns a value of 3, then the conversion module 216 will compute a value of a 47.3 nanosecond period. This result is an estimate of the period 106 of the digital signal 102. There are many suitable implementations of conversion module 216, which will generally be dependant on the format required by a direct digital synthesizer 218. For example, the direct digital synthesizer 218 may require a frequency input in which case the conversion module 216 would output a frequency value instead of a clock period. The period 106 estimate value may be numerically inverted resulting in a frequency value for programming direct digital synthesizer 218. For example, if the period 106 estimate value is 47.3 nanoseconds, then the inverse ($1/47.3$ nanoseconds) is the frequency value 21.14 MHz. The conversion module 216 may be coupled to a direct digital synthesizer 218.

The direct digital synthesizer 218 is configured to generate a clock signal having properties determined by the data set. A direct digital synthesizer is a way of generating signals that is becoming more widespread because advances in integrated circuit technology enable construction of higher frequency direct digital synthesizers. Given a data set specifying a frequency, the direct digital synthesizer 218 is configured to generate a signal at that frequency for use in a variety of applications such as radio receivers, digital decoders, and signal generators. According to this example embodiment, direct digital synthesizer 218 generates a clock signal that is an approximate replica of the underlying clock signal 104 of the digital signal 102 according to the data set from the conversion module 216.

In another embodiment, an output from direct digital synthesizer module 218 could supply the system reference clock 204 (the dashed line in FIG. 2 represents this optional feedback path). This could be viewed as placing the measurement modules in a feedback loop that includes direct digital synthesizer module 218. In this regard, a reference clock signal can be derived from previous measurements applied to direct digital synthesizer module 218.

Figure 3:
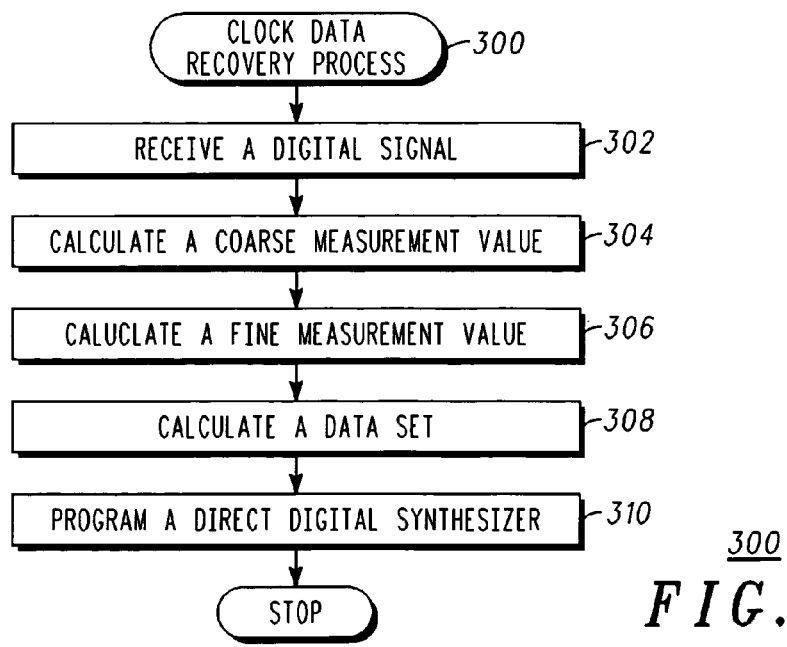
FIG. 3 illustrates a flow chart of a clock data recovery process for a direct digits synthesizer.

FIG. 3 illustrates a flow chart of a clock data recovery process 300 for a direct digital synthesizer according to an example embodiment of this invention. Process 300 recovers clock data by determining the underlying clock signal 104 of a digital signal 102, and generating a replica of clock signal 104 for decoding and recovering data. The various tasks performed in connection with process 300 may be performed by software, hardware, firmware, or any combination thereof. For illustrative purposes, the following description of process 300 may refer to elements mentioned above in connection with FIGS. 1-2. Process 300 performs a number operations described in the context of FIG. 2 above that will not be redundantly described here in the context of process 300. In practical embodiments, portions of process 300 may be performed by different elements of a system 200, e.g., the digital signal input 202, the reference clock the system reference clock 204, the reference clock signal 206, the coarse measurement module 208, the fine measurement module 210, the coarse measurement output 212, the fine measurement output 214, the conversion module 216, and the direct digital synthesizer 218.

Process 300 begins by receiving a digital signal having a clock frequency (task 302). Process 300 then calculates the coarse measurement value of the clock frequency using a coarse measurement module (task 304) as explained below in the context of FIG. 4, and a fine measurement value of the clock frequency using a fine measurement module (task 306) as explained below in the context of FIG. 6. From the coarse measurement value and the fine measurement value, process 300 calculates a data set using a conversion module (task 308). Process 300 then uses the data set to program the direct digital synthesizer to produce an output clock signal that is an approximate replica of the underlying clock signal of the received digital signal (task 310).

Figure 4:
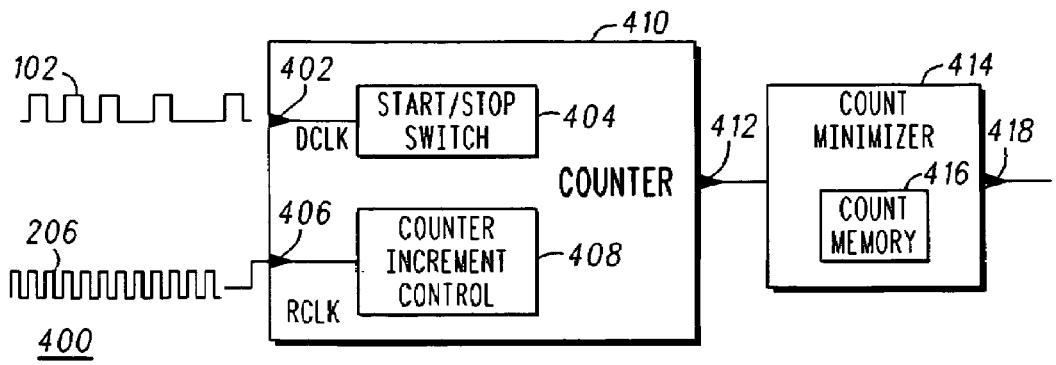
FIG. 4 illustrates a schematic representation of a counter system configured to calculate a coarse measurement value of a clock signal frequency of a digital signal.

FIG. 4 illustrates a schematic representation of a coarse measurement module configured to calculate a coarse measurement value of the clock signal frequency of a digital signal according to an example embodiment of the invention. A practical system 400 for clock data recovery may include a number of electrical components, circuits and control units other than those shown in FIG. 4. Conventional subsystems, features, and aspects of system 400 will not be described in detail herein. FIG. 4 uses the signal illustrations of FIG. 1, and system 400 shares a number of elements and features with system 200 (see FIG. 2), and common features, functions, and structure will not be redundantly described here in the context of system 400. The system 400 generally includes: a digital signal input Dclk 402, a counter start/stop switch 404, a reference clock signal input Rclk 406, a counter increment control 408, a counter 410, a counter output 412, a count minimizer 414 which includes a count memory 416, and a count minimizer output 418.

The digital signal input Dclk 402 is coupled to the start/stop switch 404 of the counter 410 and is configured to receive the digital signal 102. The start/stop switch 404 of the counter 410 is configured to start and stop the counter 410. The reference clock signal input Rclk 406 is coupled to the counter increment control 408 of the counter 410 and is configured to receive the reference clock signal 206. The counter increment control 408 is configured to increment the counter as a standard clock input of a standard counter circuit. As will be explained in detail below, counter 410 is configured to calculate coarse measurements of clock frequency from the digital signal input Dclk 402, and the counter's output 412 is fed into count minimizer 414 which determines the coarse measurement value of the clock frequency at the a count minimizer output 418.

The counter 410 is a digital up-counter, which is a general device that counts the number of times a signal edge occurs in relation to another signal edge. An up counter increases (increments) in value generally starting from zero. Electronic counters may be implemented, without limitation, using circuits such as flip-flops, and many types exist, each useful for different applications, e.g., asynchronous, ripple, synchronous. Counter circuits are usually digital in nature, and usually count in binary or binary coded decimal. Increments are triggered differently depending on the design; for example, increments may be triggered by a signal edge such as a rising signal edge or a falling signal edge. For this embodiment, the start/stop switch 404 allows counting to start from zero, and the counter increment control 408 increments the counter. The counter output 412 is coupled to the count minimizer 414.

The count minimizer 414 is configured to determine when (at what time) the counter output 412 corresponds to the number of cycles of reference clock signal input Rclk 406 in one period of the digital signal input Dclk 402. For example, the digital signal 102 in FIG. 1 has a pattern (reference number 110) which is "10001". The count minimizer 414 searches for a pattern such as pattern 108 which is "101". The "101" pattern corresponds to the reference clock signal 104 allowing correct determination of the clock signal 104 by the method explained below.

The count minimizer 414 contains the count memory 416, which is configured to hold count values as large or as small as the counter produces. At the first activation of the count minimizer 414, the count memory 416 is initialized to the maximum count possible by the counter 410. After the completion of the counter 410, the counter output 412 is compared to the count memory 416. If the counter output 412 is less than value in the count memory 416, the count memory 416 value is replaced by the value of the counter output 412. The count memory 416 retains its value for each activation of the coarse measurement module after the initial activation for this measurement. When the value of the count memory 416 no longer decreases, a minimum value is reached. That minimum value is the number of cycles of the reference clock signal input Rclk 406 in one period of the digital signal input Dclk 402, which is the coarse measurement value of the clock frequency. The counter minimizer output 418 may be coupled to an external module such as the conversion module 216 and is configured to output the count memory 416 value as the coarse measurement value of the clock frequency.

Figure 5:
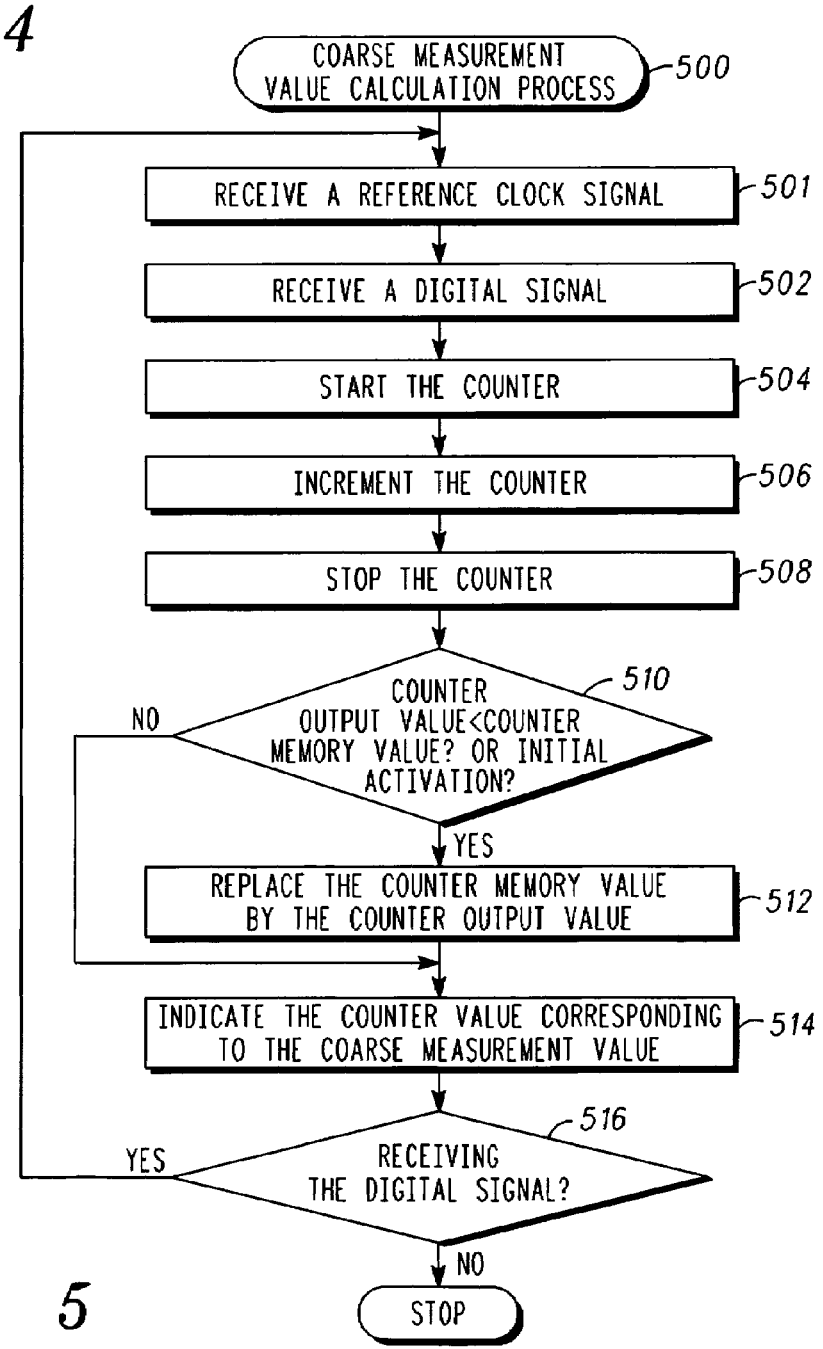
FIG. 5 illustrates a flow chart of a coarse measurement value calculation process for a clock signal frequency of a digital signal.

FIG. 5 illustrates a flow chart of a coarse measurement value calculation process 500 for a clock signal frequency of a digital signal according to the example embodiment of the invention. Process 500 measures the coarse value of the data clock frequency by measuring the number of cycles of the reference clock signal 206 in one period 106 of the digital signal 102. The various tasks performed in connection with process 500 may be performed by software, hardware, firmware, or any combination thereof. For illustrative purposes, the following description of process 500 may refer to elements mentioned above in connection with FIGS. 1-2 and 4. In practical embodiments, portions of process 500 may be performed by different elements of the system 400, e.g., the digital signal input Dclk 402, the start/stop switch 404, the reference clock signal input Rclk 406, the counter increment control 408, the counter 410, and the counter output 412.

Process 500 may begin by receiving the reference clock signal 206, wherein the reference clock signal 206 is used as a basis for comparison to a digital signal to determine a frequency of that digital signal (task 501). The method then receives the digital signal 102 having an underlying clock signal 104 with a clock frequency (task 502). Upon receiving a first signal edge of the digital signal 102 at the start/stop switch 404, the counter 410 is started (task 504). Upon receiving each clock pulse of the reference clock signal 206 at the counter increment control 408, the counter 410 is incremented (task 506). Upon receiving a second signal edge of the digital signal 102 at the start/stop switch 404, the counter 410 stops (task 508). The first signal edge may be a rising or falling signal edge, and the second signal edge may be a rising or falling signal edge depending on the implementation. The value of the counter output 412 is compared to the count memory 416 value (inquiry task 510). If the value of the counter output 412 is less than the count memory 416 value or if this is the initial activation of the coarse measurement module for this measurement, then the count memory 416 value is replaced by the counter output 412 (task 512). The count memory 416 value, which corresponds to the coarse measurement value of the data clock frequency, is then indicated (task 514) at the counter output 412. The counter value is an integer number of the reference clock signal 404 periods in one clock period 106 of the digital signal 102. For example, as explained in the context of FIG. 2 above, if the period 106 of the digital signal 102 is 47.3 nanoseconds and the reference clock signal 206 has a 1 nanosecond period, the coarse measurement module 208 will compute a value of 47 (cycles). Process 500 then leads back to task 501 unless the coarse measurement module no longer receives the digital signal (inquiry task 516) in which case process 500 may stop.

Additionally, the signal edges of the digital signal 102 and the reference clock 206 may not always be aligned so there may be fractional differences in alignment of the two signals. To determine the fractional differences between the rising edge of the reference clock 206 and the rising edge of the digital signal 102 a fine measurement system is used as explained in detail below. An alternative alignment would replace the reference clock with a time-shifted version of the replica output from direct digital synthesizer module 218.

FIG. 6 illustrates a schematic representation of a fine measurement system configured to calculate a fine measurement value of the clock signal frequency of the digital signal 102 according to an example embodiment of the invention. The various blocks depicted in FIG. 6 may be realized by any number of physical components or modules located throughout the system 600. A practical system 600 may include a number of electrical components, circuits and controller units other than those shown in FIG. 6. Conventional subsystems, features, and aspects of system 600 will not be described in detail herein. System 600 may share a number of elements and features with systems 100 and 200 (see FIGS. 1-2), and common features, functions, and structure will not be redundantly described here in the context of system 600. The system 600 generally includes: a digital signal input Dclk 602; a tap delay line 606; a set of physical locations (taps) 608; a plurality of inverted SR latches 612; a plurality of XNOR gates 620; a reference clock signal input Rclk 630; a tap delay line input 604; and a memory 632 which includes a plurality of 1-bit memory cells 634. In this example, each inverted SR latch 612 includes: a plurality of $\overline{S}$ inputs 610; a plurality of $\overline{R}$ inputs 614; a plurality of Q outputs 616; and a plurality of $\overline{Q}$ outputs 622. In this example, each XNOR gate 620 includes: a plurality of X inputs 618; a plurality of Y inputs 624; and a plurality of outputs 626.

Digital signal input Dclk 602 corresponds to the digital signal input 202 and is configured to receive the digital signal 102. The digital signal 202 is explained in the context of FIG. 2 above wherein digital signal input 202 is coupled to the fine measurement module 210. The digital signal input Dclk 602 is coupled to an input 604 (the only input) of a tap delay line 606.

The tap delay line 606 is configured to convert the timing of the digital signal 102 into a set of physical locations (taps 608) each indicating the digital signal 102 amplitude at a specific time. Each of taps 608 is coupled to a corresponding $\overline{S}$ input 610 of a plurality of inverted SR latches 612 which store and hold the values on the $\overline{S}$ inputs 610 according to a reference clock Rclk 206 coupled to the $\overline{R}$ inputs 614 of the plurality of inverted SR latches 612. The Q outputs 616 of the plurality of inverted SR latches 612 are coupled to the X inputs 618 of a plurality of XNOR gates 620. The $\overline{Q}$ outputs 622 of the plurality of inverted SR latches 612 are coupled the Y inputs 624 of the plurality of XNOR gates 620. The XNOR gates 620 compare adjacent inverted SR latches 612, and determine when the digital signal 102 as stored in the tap delay line 606 changes from a logic "1" to a logic "0" or a logic "0" to a logic "1". The outputs 626 of the XNOR gates 620 are each coupled to a 1-bit memory cell 634 of a memory 632 for storage and access. The memory 632 may be coupled to an external location, for example, conversion module 214.

The tap delay line 606 is configured such that each tap delay 628 evenly divides the period of the reference clock signal 104. The tap delay line 606 is a single-input multiple-output device, wherein the output state at a given tap 608 at time t is the same as the input 604 state at time t−n, where n is a number of time unit delays 628. To reach each tap 608, the input sequence undergoes a delay of n time units, such as n femtoseconds, nanoseconds, or microseconds. There are many ways of implementing a tap delay line such as, without limitation, an RC circuit, a transmission line, or an analog delay line.

The tap delay line 606 converts the timing of the digital signal 102 into a set of physical locations (taps 608) each indicating the digital signal 102 amplitude at a specific time. The digital signal 102 is continuously fed into the tap delay line 606 input 604, and the digital signal 102 is delayed by a time unit delay 628. Therefore, each tap 608 shows the value of digital signal 102 at time delay t−n. For this embodiment, the time unit delay 628 is set to the reference clock signal 206 period divided by the number of taps 608. The choice of the number of taps 608 is implementation dependent according to the desired accuracy of the clock estimate, for example, without limitation, 10. Each of taps 608 of the tap delay line 606 are coupled to a corresponding $\overline{S}$ input 610 of a plurality of inverted SR latches 612.

The reference clock input Rclk 630 is coupled to the $\overline{R}$ inputs 614 of the inverted SR latches 612 and is configured to receive the reference clock signal input 206. The reference clock signal input 206 is explained in the context of FIG. 2 above. The reference clock signal 206 is a common reference for both the coarse measurement module 208 and fine measurement module 210 as these devices calculate complimentary measurements of the digital signal 102.

Each of the plurality of inverted SR latches 612 has an $\overline{S}$ input 610, an $\overline{R}$ input 614, a Q output 616, and a $\overline{Q}$ output 622. The $\overline{S}$ input 610 of each of the inverted SR latches 612 is exclusively coupled to a separate tap 608 of the tap delay line 606, and each of the $\overline{R}$ inputs 614 of the inverted SR latches 612 are commonly coupled to the reference clock signal input 630. The inverted SR latch 612 is a circuit that holds a specific logic value. FIG. 7 illustrates a schematic of an inverted SR latch 612. An inverted SR latch, as shown in FIG. 7, is generally made from cross-coupled NAND gates 702, but may be made from NOR or other types of logic gates. FIG. 8 is a logic table illustrating the behavior (state) of an inverted SR latch 612 depending on its inputs $\overline{S}$ and $\overline{R}$. If the values of $\overline{S}$ and $\overline{R}$ are both 1, then the values of outputs Q and $\overline{Q}$ are maintained at their previous values. If the value of $\overline{S}$ is 1 and $\overline{R}$ is 0, then the value of $\overline{Q}$ is set to 0, and Q will become 0 when $\overline{S}$ and $\overline{R}$ both return to 1. If the value of $\overline{S}$ is 0 and $\overline{R}$ is 1, then the value of $\overline{Q}$ is set to 1, and Q will become 1 when $\overline{S}$ and $\overline{R}$ both return to 1. If the values of $\overline{S}$ and $\overline{R}$ are both 0, then the values of Q and $\overline{Q}$ are implementation dependant.

Each of taps 608 of the tap delay line 606 are coupled to a corresponding $\overline{S}$ input 610, and the reference clock Rclk 206 is coupled to the $\overline{R}$ inputs 614 of the plurality of inverted SR latches 612. The inverted SR latches 612 store and hold the values of the $\overline{S}$ inputs 610 when the reference clock Rclk 206 on input $\overline{R}$ is at logic "1". The digital signal 102 propagates through the tap delay line 606 until the reference clock input Rclk 206 becomes logic "1" at which time the value on the taps 608 is stored and held in the inverted SR latches 612. To ensure an accurate fine measurement, the delay through the delay line should correspond to one period of the reference clock, and is usually insured by implementation of a delay locked loop. The outputs of the inverted SR latches 612 are coupled to the plurality of XNOR gates 620 as will be explained next.

Each of the plurality of XNOR logic gates 620 has a first input (X input) 618 and a second input (Y input) 624, wherein the first input 618 is coupled to the Q output 616 of a first inverted SR latch, and the second input is coupled to the $\overline{Q}$ output 624 of second inverted SR latch 612 adjacent to the first inverted SR latch. An exclusive nor (XNOR) is a standard logic gate and has an inverse output to that of an exclusive OR gate. FIG. 9 illustrates a standard XNOR logic table. As shown in FIG. 9, the XNOR has an output of logic "0" when either inputs X and Y are different, and an output of logic "1" when they are the same.

The Q outputs 616 of the plurality of inverted SR latches 612 are coupled to the X inputs 618 of a plurality of XNOR gates 620. The $\overline{Q}$ outputs 622 of the plurality of inverted SR latches 612 are coupled to the Y inputs 624 of the plurality of XNOR gates 620. The XNOR gates 620 compare adjacent inverted SR latches 612, and determine (have output value "1") when the digital signal 102 as stored in the tap delay line 606 transitions at a digital waveform edge from a logic "1" to a logic "0" or a logic "0" to a logic "1". The XNOR gate with logic "1" is coupled to one inverted SR latch 612 coupled to a tap 608 with logic "1" (or "0"), and one inverted SR latch 612 coupled to a tap 608 with logic "0" (or "1"). The two adjacent taps are where the digital signal 102 transitions from "0" to "1" (or "1" to "0"). There are ways other than that used in this example embodiment for determining the "0/1" transition point of the tap delay line 606 such as, without limitation, combinations of XORs, NANDs, and the like. The location of the "0/1" transition point on the tap delay line 606 indicates the delay, and thus the fraction of the reference clock 206 period by which the digital signal 102 differs from the reference clock 206 is the fine measurement value of the digital signal 102.

The outputs 626 of the XNOR gates 620 are each coupled to a 1-bit memory cell of a memory 632 for storage and access. The memory 632 has a plurality of 1-bit memory cells 634, and it is configured to indicate the fine measurement value, wherein each of the 1-bit memory cells 634 is exclusively coupled to the output of one of the plurality of XNOR logic gates 620, wherein the connection order corresponds to the tap order. Due to the construction of the register, the XNOR pattern also is the fraction of the frequency period, for example three out of ten. The memory 632 may be coupled to an external location, for example, conversion module 216.

Figure 10:
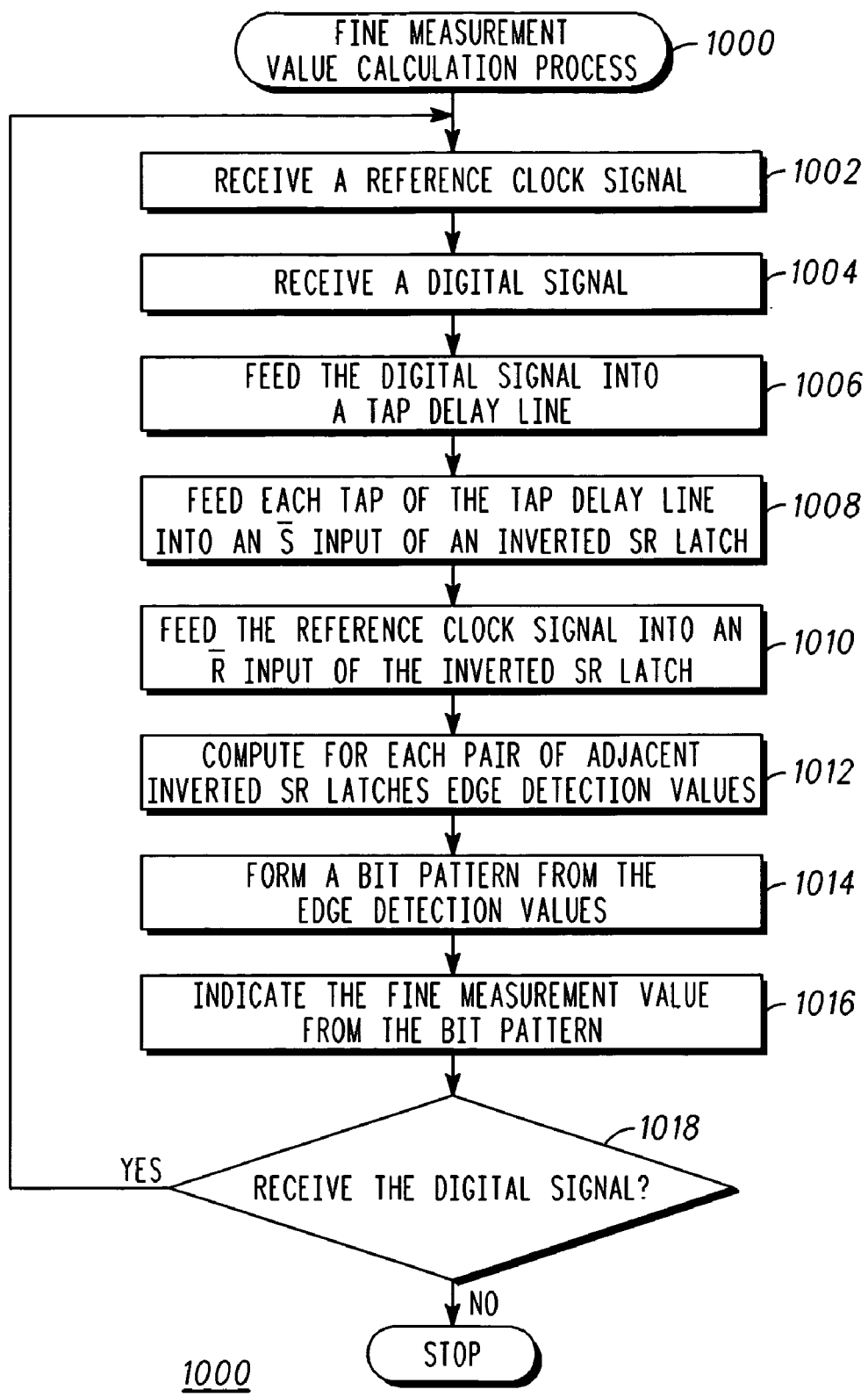
FIG. 10 illustrates a flow chart of a digital clock frequency fine measurement value calculation process for a clock signal frequency of a digital signal.

FIG. 10 illustrates a flow chart of a digital clock frequency fine measurement value calculation process 1000 according to an example embodiment of the invention. The various tasks performed in connection with process 1000 may be performed by software, hardware, firmware, or any combination thereof. For illustrative purposes, the following description of process 1000 may refer to elements mentioned above in connection with FIGS. 1-2 and 6-9. Process 1000 performs a number operations described in the context of FIG. 6 above that will not be redundantly described here in the context of process 1000. In practical embodiments, portions of process 1000 may be performed by different elements of a system 600, e.g. the digital signal input Dclk 602, the reference clock signal input 630, the tap delay line input 604, a tap delay line 606, a set of physical locations (taps) 608, the inverted SR latches 612 which include: the $\overline{S}$ inputs 610, the $\overline{R}$ inputs 614, the Q outputs 616, and the $\overline{Q}$ outputs 622, the XNOR gates 620 which include: (the inputs 618, the Y inputs 624 and the outputs 626), and the memory 632.

Process 1000 may begin by receiving a reference clock signal, wherein the reference clock signal is used as a basis for comparison to determine a frequency of a digital signal (task 1002), and a digital signal having a frequency such as the digital signal 102 (task 1004). Next, process 1000 feeds the digital signal 102 into a tap delay line 606 (task 1006). The tap delay line 606 converts the timing of the digital signal 102 into a set of physical locations as explained in the context of FIG. 6 above. The output of each tap 608 of the tap delay line 606 is then fed into an $\overline{S}$ input 610 of an inverted SR latch 612 (task 1008), wherein each inverted SR latch 612 is one of a plurality of inverted SR latches, each corresponding to a tap of the tap delay line. The inverted SR latches store the tap 608 outputs when process 1000 feeds the reference clock signal 206 into an $\overline{R}$ input of the inverted SR latch 612 (task 1010).

The stored tap values in the inverted SR latches form a "snapshot" of the digital signal 102 of one period of the reference clock signal. For example, the tap values might be 0001111111. Process 1000 then computes, for each pair of adjacent inverted SR latches, edge detection values corresponding to a logical XNOR operation of a Q output 616 of one of the inverted SR latches 612 and a $\overline{Q}$ output 622 of an inverted SR latch 612 adjacent to the one of the inverted SR latches 612 (task 1012) as explained above in the context of FIG. 6. The edge detection values may be, for example, 0 or 1. Process 1000 then forms a bit pattern from the edge detection values (task 1014) and indicates the fine measurement value from the bit pattern (task 1016). A bit pattern may be, for example, 0010000000 indicating a fine measurement value of 0.3. Process 1000 then leads back to task 1002, if the fine measurement module continues to receive the digital signal (inquiry task 1018), otherwise process 1000 may stop.

Advantages of clock data recovery for a direct digital synthesizer include a broader tuning range, very fast frequency switching time, low power consumption, and lower reference clock frequency. For the prior art, PLL over-sampling of data requires a high sampling rate with the penalty of requiring very fast clock that is much faster than the data signal 102. Embodiments of the invention eliminate the need for having a clock rate faster than the data signal 102 since there is no need to over-sample the data.

The previous detailed description is merely illustrative in nature and is not intended to limit the embodiments of the invention or the application and uses of such embodiments. Furthermore, there is no intention to be bound by any expressed or implied theory presented in the preceding technical field, background, brief summary or detailed description.

Embodiments of the invention are described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques and components related to signal processing, digital circuits, counters, digital latch circuits, tap delay lines and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The preceding description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depict example arrangements of elements, additional intervening elements, devices, features, or components may be present in an embodiment of the invention (assuming that the functionality of the system is not adversely affected).

What is claimed is:

1. A method for clock data recovery for a direct digital synthesizer, the method comprising:
   receiving a digital signal having a clock frequency;
   calculating a coarse measurement value of the clock frequency using a counter, wherein calculating the coarse measurement value comprises:
   obtaining a counter value from the counter upon receiving a first signal edge of the digital signal;
   incrementing the counter value upon receiving each signal edge of a reference clock signal;
   stopping the counter upon receiving a second signal edge of the digital signal;
   placing the counter value into a count memory, if the counter value is less than a stored counter value currently in the count memory; and
   indicating the coarse measurement value, wherein the coarse measurement value corresponds to the counter value;
   calculating a fine measurement value of the clock frequency using a tap delay line;
   calculating a data set for the direct digital synthesizer from the coarse measurement value and the fine measurement value; and
   programming the direct digital synthesizer using the data set to produce an output clock signal with a frequency that is an approximate replica of the clock frequency.

2. A method for clock data recovery for a direct digital synthesizer, the method comprising:
   receiving a digital signal having a clock frequency;
   calculating a coarse measurement value of the clock frequency using a counter, wherein calculating the coarse measurement value comprises:
   obtaining a counter value from the counter upon receiving a first signal edge of the digital signal, wherein the first signal edge is a rising signal edge;
   incrementing the counter value upon receiving each signal edge of a reference clock signal;
   stopping the counter upon receiving a second signal edge of the digital signal;
   placing the counter value into a count memory, if the counter value is less than a stored counter value currently in the count memory; and
   indicating the coarse measurement value, wherein the coarse measurement value corresponds to the counter value;
   calculating a fine measurement value of the clock frequency using a tap delay line;
   calculating a data set for the direct digital synthesizer from the coarse measurement value and the fine measurement value; and
   programming the direct digital synthesizer using the data set to produce an output clock signal with a frequency that is an approximate replica of the clock frequency.

3. A method for clock data recovery for a direct digital synthesizer, the method comprising:
   receiving a digital signal having a clock frequency;
   calculating a coarse measurement value of the clock frequency using a counter, wherein calculating the coarse measurement value comprises:
   obtaining a counter value from the counter upon receiving a first signal edge of the digital signal, wherein the first signal edge is a falling signal edge;
   incrementing the counter value upon receiving each signal edge of a reference clock signal;
   stopping the counter upon receiving a second signal edge of the digital signal;
   placing the counter value into a count memory, if the counter value is less than a stored counter value currently in the count memory; and
   indicating the coarse measurement value, wherein the coarse measurement value corresponds to the counter value;
   calculating a fine measurement value of the clock frequency using a tap delay line; and
   calculating a data set for the direct digital synthesizer from the coarse measurement value and the fine measurement value; and
   programming the direct digital synthesizer using the data set to produce an output clock signal with a frequency that is an approximate replica of the clock frequency.

4. A method for clock data recovery for a direct digital synthesizer, the method comprising:
   receiving a digital signal having a clock frequency;
   calculating a coarse measurement value of the clock frequency using a counter, wherein calculating the coarse measurement value comprises:
   obtaining a counter value from the counter upon receiving a first signal edge of the digital signal, wherein the second signal edge is a rising signal edge;
   incrementing the counter value upon receiving each signal edge of a reference clock signal;
   stopping the counter upon receiving a second signal edge of the digital signal, wherein the second signal edge is a rising signal edge;
   placing the counter value into a count memory, if the counter value is less than a stored counter value currently in the count memory; and
   indicating the coarse measurement value, wherein the coarse measurement value corresponds to the counter value;
   calculating a fine measurement value of the clock frequency using a tap delay line; and
   calculating a data set for the direct digital synthesizer from the coarse measurement value and the fine measurement value; and
   programming the direct digital synthesizer using the data set to produce an output clock signal with a frequency that is an approximate replica of the clock frequency.

5. A method for clock data recovery for a direct digital synthesizer, the method comprising:
   receiving a digital signal having a clock frequency;
   calculating a coarse measurement value of the clock frequency using a counter, wherein calculating the coarse measurement value comprises:
   obtaining a counter value from the counter upon receiving a first signal edge of the digital signal;
   incrementing the counter value upon receiving each signal edge of a reference clock signal;
   stopping the counter upon receiving a second signal edge of the digital signal, wherein the second signal edge is a falling signal edge;
   placing the counter value into a count memory, if the counter value is less than a stored counter value currently in the count memory; and indicating the coarse measurement value, wherein the coarse measurement value corresponds to the counter value;

calculating a fine measurement value of the clock frequency using a tap delay line; and calculating a data set for the direct digital synthesizer from the coarse measurement value and the fine measurement value; and programming the direct digital synthesizer using the data set to produce an output clock signal with a frequency that is an approximate replica of the clock frequency.

6. A method for clock data recovery for a direct digital synthesizer, the method comprising:

receiving a digital signal having a clock frequency;

calculating a coarse measurement value of the clock frequency using a counter;

calculating a fine measurement value of the clock frequency using a tap delay line, wherein calculating the fine measurement value comprises:

receiving a reference clock signal, wherein the reference clock signal is used as a basis for comparison to determine a frequency of the digital signal;

feeding the digital signal into a tap delay line;

calculating a bit pattern of edge detection values from the tap delay line;

indicating the fine measurement value from the bit pattern of edge detection values; and repeating the receiving, the feeding, the calculating, and the indicating steps for calculating the fine measurement value for each clock cycle of the digital signal;

calculating a data set for the direct digital synthesizer from the coarse measurement value and the fine measurement value; and programming the direct digital synthesizer using the data set to produce an output clock signal with a frequency that is an approximate replica of the clock frequency.

7. A method according to claim 6, wherein calculating the bit pattern comprises:

feeding each tap of the tap delay line into an $\overline{S}$ input of an inverted SR latch;

feeding the reference clock signal into an $\overline{R}$ input of the inverted SR latch, wherein the inverted SR latch is one of a plurality of inverted SR latches each corresponding to a tap of the tap delay line;

computing, for each pair of adjacent inverted SR latches, wherein each pair includes a first and a second SR latches, edge detection values corresponding to a logical XNOR operation of a Q output of the first inverted SR latch and a $\overline{Q}$ output of the second inverted SR latch adjacent to the first inverted SR latch; and forming the bit pattern from the edge detection values.

8. A system for calculating a coarse measurement value of a clock frequency, the system comprising:

a reference clock signal input configured to receive a reference clock signal;

a digital signal input configured to receive a digital signal having a clock frequency;

a counter having a counter output coupled to the reference clock input and the digital signal input, the counter being configured to:

start counting upon receiving a first signal edge of the digital signal;

increment upon receiving each clock pulse of the reference clock signal;

stop counting upon receiving a second signal edge of the digital signal;

a counter start/stop switch coupled to the digital signal input and configured to start/stop the counter;

a counter increment control coupled to the reference clock signal input and configured to increment the counter;

a first output coupled to the counter and configured to indicate the counter output value;

a count memory, having a count memory value, containing a previous value of the counter and coupled to the first output and configured to: replace the count memory value with the counter output value, if the counter output value is less than the count memory value; and a second output coupled to the count memory and configured to indicate a value of the counter, wherein the value of the counter corresponds to the coarse measurement value of the clock frequency.

9. A system according to claim 8, wherein the reference clock signal is derived from previous coarse measurement values.

10. A method for calculating a fine measurement value of a clock frequency, the method comprising:

receiving a reference clock signal, wherein the reference clock signal is used as a basis for comparison to determine a clock frequency of a digital signal having clock cycles;

receiving the digital signal;

feeding the digital signal into a tap delay line;

feeding each tap of the tap delay line into an $\overline{S}$ input of an inverted SR latch;

feeding the reference clock signal into an $\overline{R}$ input of the inverted SR latch, wherein the inverted SR latch is one of a plurality of inverted SR latches each corresponding to a tap of the tap delay line;

computing, for each pair of adjacent inverted SR latches, wherein each pair includes first and a second SR latches, edge detection values corresponding to a logical XNOR operation of a Q output of the first inverted SR latch and a $\overline{Q}$ output of the second inverted SR latch adjacent to the first inverted SR latch;

forming a bit pattern from the edge detection values;

indicating the fine measurement value, wherein the fine measurement value is determined from the bit pattern; and repeating the above steps for each of the clock cycles of the digital signal.

11. A system for calculating a fine measurement value of a clock frequency, the system comprising:

a digital signal input configured to receive a digital signal having the clock frequency;

a reference clock signal input configured to receive a reference clock signal having a period;

a tap delay line, having a tap order, coupled to the digital signal input and configured such that each tap delay evenly divides the period of the reference clock signal;

a plurality of inverted SR latches, each having an $\overline{S}$ input, an $\overline{R}$ input, a Q output, and a $\overline{Q}$ output, wherein the $\overline{S}$ input of each of the inverted SR latches is exclusively coupled to a separate tap of the tap delay line, and the $\overline{R}$ inputs of the inverted SR latches are commonly coupled to the reference clock signal input; and a plurality of XNOR logic gates each having a first input and a second input, wherein the first input is coupled to the Q output of a first inverted SR latch, and the second input is coupled to the $\overline{Q}$ output of a second inverted SR latch, wherein the second inverted SR latch is adjacent to the first inverted SR latch.

12. A system according to claim 11, further comprising a memory having a plurality of 1-bit memory cells configured to indicate the fine measurement value, wherein each of the 1-bit memory cells is exclusively coupled to the output of one of the plurality of XNOR logic gates using a connection order, wherein the connection order corresponds to the tap order.

13. A system according to claim 11, wherein the reference clock signal is derived from previous fine measurement values.

* * * * *